United States Patent [19]
Viertel et al.

[11] Patent Number: 6,045,175
[45] Date of Patent: Apr. 4, 2000

[54] SUN VISOR FOR VEHICLES

[76] Inventors: Lothar Viertel, Lilienstrasse 4, D-66802 Altforweiler, Germany; Patrick Welter, 12, Rue Principal, F-57730 La Chambre; Isabelle Becker, 4, Rue Mathieu Racan, F-57150 Creutzwald, both of France

[21] Appl. No.: 09/120,943

[22] Filed: Jul. 22, 1998

[51] Int. Cl.⁷ ........................................................ B60J 3/02
[52] U.S. Cl. ........................ 296/97.9; 296/97.1; 296/97.12
[58] Field of Search ............................... 296/97.9, 97.12, 296/97.13, 97.1; 248/291.1, 292.13, 292.11

[56] References Cited

FOREIGN PATENT DOCUMENTS 0398400  11/1990  European Pat. Off. ............ 296/97.12
2237878  2/1974  Germany .............................. 296/97.1

*Primary Examiner*—D. Glenn Dayoan
*Assistant Examiner*—Patricia Engle
*Attorney, Agent, or Firm*—Harness, Dickey & Pierce, P.L.C.

[57] ABSTRACT

In a sun visor for vehicles, the sun visor body has a recess in its middle region of its upper longitudinal edge. A bearing device is disposed in the recess. The bearing device has an axle body with trunnions that engage the inside of the sun visor body and a detent spring that clamps the axle body. The bearing device also has a bearing housing for receiving the detent spring, for receiving the axle body, and for receiving an adapter that can be fastened to the vehicle body. The adapter, fixed to the bearing housing via clip fastenings, carries the bearing device and the sun visor body which is joined to the bearing device in hinged fashion via the axle body.

16 Claims, 3 Drawing Sheets

SUN VISOR FOR VEHICLES

BACKGROUND OF THE INVENTION

The invention relates to a sun visor for vehicles, which has a sun visor body which in the middle region of its upper longitudinal edge has a recess in which a bearing device is disposed. The bearing device has an axle body with trunnions that engage the inside of the sun visor body and a detent spring that clamps the axle body.

Sun visors of the above type are known in various versions. In this respect, see German Utility Model 1 922 362 and German Patent Disclosures DE 30 04 254 A1 and DE 195 33 897 A1. The disadvantage of the known sun visors is considered to be that the sun visor body, when not in use, is not held securely against the headliner of the vehicle.

BRIEF SUMMARY OF THE INVENTION

One object of the invention is to make available a sun visor of the type referred to above whose sun visor body is held securely against the headliner even under extreme heat or cold conditions or in the face of severe shaking during vehicle operation. A bearing device is also sought that comprises only a few individual parts that are simple to manufacture and to mount.

One aspect of the present invention provides a sun visor for a vehicle body. The sun visor body has a middle region and an upper longitudinal edge, and a recess in the middle region of the upper longitudinal edge. A bearing device is disposed in the recess. The bearing device includes a bearing housing, an axle body, a detent spring and an adapter. The bearing housing receives the detent spring, the axle body, and the adapter.

The bearing housing includes a base plate and a U-shaped profile integrally joined with the base plate. The U-shaped profile has a base leg which has a rounded feature, a vertically extending flange and an outer contour. The flange is offset from and extends parallel to the outer contour and is provided with undercut protrusions. The walls of the U-shaped profile have clip protrusions for clip fastening of the adapter to the bearing housing. The base plate has ribs, where the ribs run into the interior of the U-shaped profile and form protuberances. The base plate also has a cup-shaped indentation which defines an oval through hole for a fastening screw, which passes through the adapter. The base plate further includes positioning domes.

The axle body has a cylindrical middle part, which has a flat face that is defined on one end and acts as a detent face for the detent spring. The axle body also has two annular raised portions, which act as shift-prevention means. The axle body also has two trunnions and a flange, all of which engage the sun visor body.

The detent spring clamps the axle body to the bearing housing. The detent spring is U-shaped of two legs. The detent spring has a base leg with a rounded feature which corresponds to the U-shaped profile of the bearing housing. In addition, one spring leg of the detent spring is relatively wide and the other spring leg is relatively narrow. The free ends of the spring legs have strutlike shoulders.

The adapter is an approximately rectangular middle part which has slot recesses and steplike shaped bodies joining the slot recesses to the right and left for engagement with the U-shaped profile of the bearing housing and for locking from behind the clip protrusions of the U-shaped profile that protrude into a profile channel. There is also a spacer sleeve, which defines an oval through hole for a fastening screw, wherein the free ends of the spring legs engage the slot recesses in the adapter.

Accordingly, the sun visor body is joined to the bearing device in hinged fashion, the adapter carries the bearing device and the sun visor body, and the adapter is fastened to the vehicle body.

These and other objects, advantages, and features of the present invention will be better understood upon review of the following detailed description of the preferred embodiments.

DETAILED DESCRIPTION OF THE INVENTION

Figure 1:
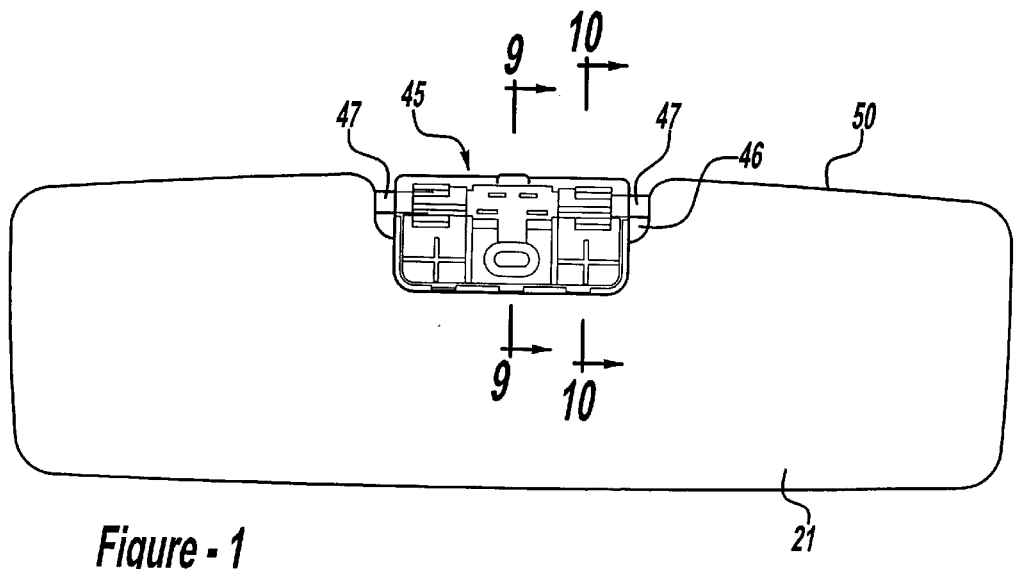
FIG. 1 is an elevational view of a sun visor with the bearing device of the present invention.
Figure 9:
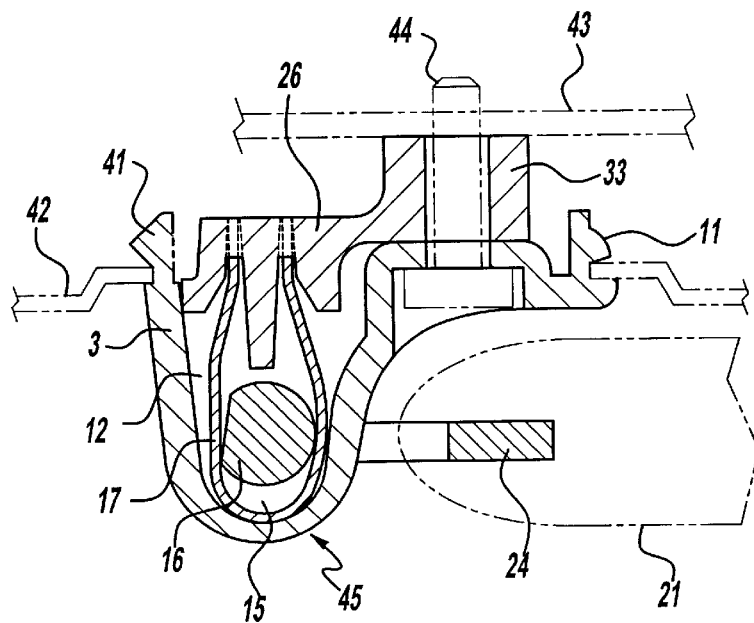
FIG. 9 is a sectional view taken along the line A—A of FIG. 1.
Figure 10:
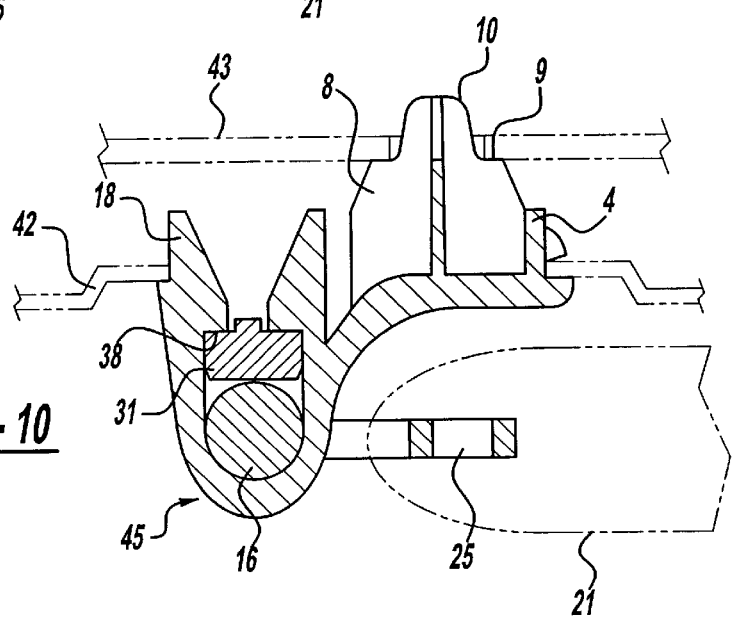
FIG. 10 is a sectional view taken along the line B—B of FIG. 1.

As shown in FIG. 1, the sun visor includes a sun visor body 21, embodied as an generally rectangular plate, and a bearing device 45. The bearing device 45 is connected to both the sun visor body 21 and to the vehicle part. In FIGS. 9 and 10, a support part 43 is indicated by the dotted-dashed lines. The bearing device 45 is placed in a recess provided in the middle region of the upper longitudinal edge 50 of the sun visor body 21.

The sun visor body 21 may be made from polyurethane (PU), expanded polypropylene (EPP), an injection-molded polypropylene (PP) part, or a blow-molded PP part. If it is embodied of polyurethane (PU) or EPP (a foam part), it is recommended that the sun visor body 21 be sheathed with decorative material. For a sun visor body 21 formed of an injection-molded or blow-molded PP part it is also possible to omit the sheathing.

Figure 2:
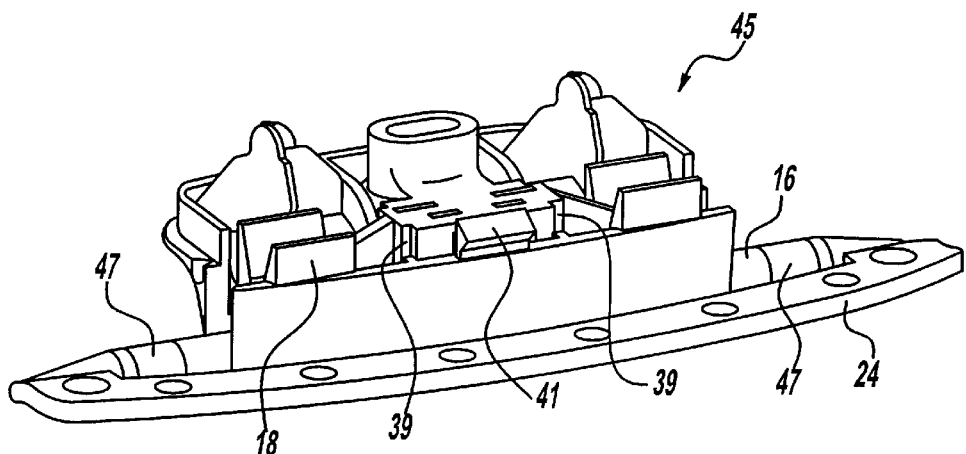
FIG. 2 is a perspective view of the entire bearing device.
Figure 7:
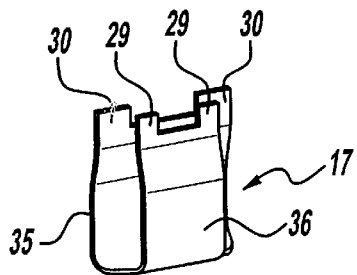
FIG. 7 illustrates the detent spring.
Figure 8:
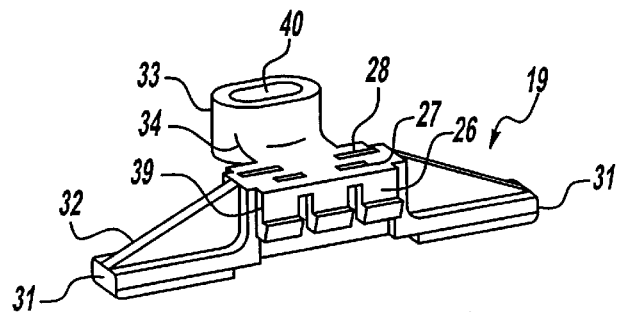
FIG. 8 illustrates an adapter.

FIG. 2 illustrates an entire bearing device, which includes a bearing housing 1 (FIGS. 3, 4 and 5), an axle body 16 (FIG. 6), a detent spring 17 (FIG. 7) and an adapter 19 (FIG. 8).

Figure 3:
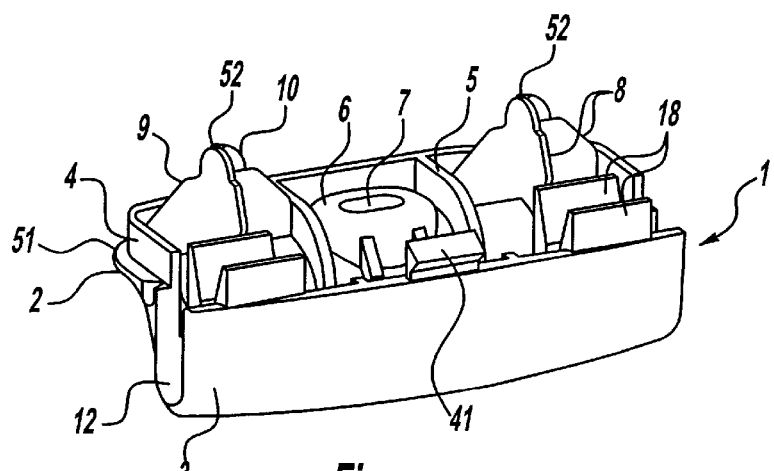
FIG. 3 is a perspective view of the bearing housing of the bearing device of FIG. 2.
Figure 4:
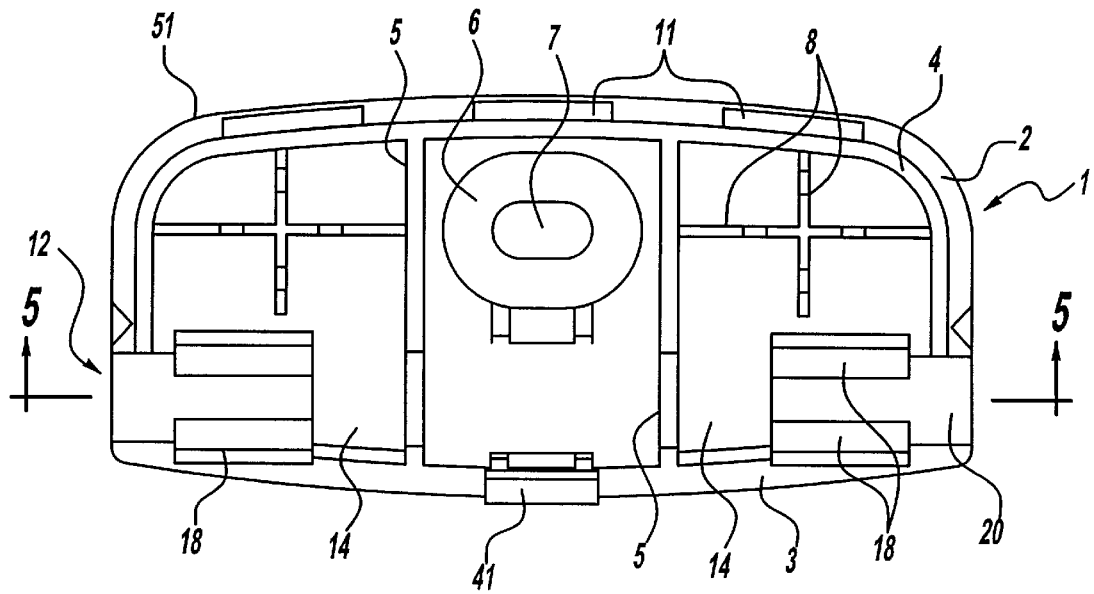
FIG. 4 is a plan view of the bearing housing of FIG. 3.
Figure 5:
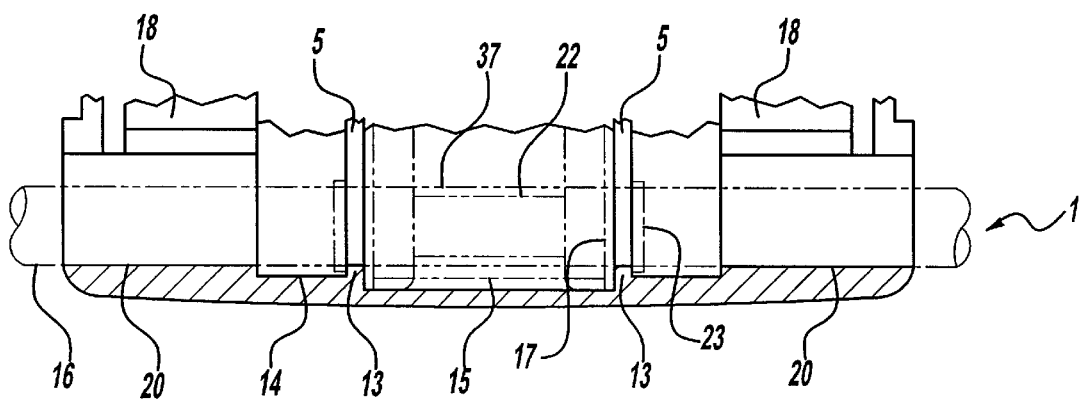
FIG. 5 is a sectional view taken along the line C—C of FIG. 4.

As shown in FIGS. 3, 4 and 5, the bearing device 45 first includes the bearing housing 1. The housing 1 is a plastic injection-molded part and comprises an approximately rectangular base plate 2 with rounded features and a rounded U-shaped profile 3 formed or embodied on it. The base plate 2 has, on its back side, a vertically extending flange 4, which is offset from the outer contour 51 and extends parallel to the outer contour 51. On the long side of the flange 4, the flange 4 has undercut protrusions 11. In the embodiment shown, there are three undercut protrusions 11. It should be understood that less than or more than three protrusions 11 may be present without departing from the spirit or scope of the present invention.

In addition, the flange 4 has ribs 5 which run into a channel 12 formed by the U-shaped profile 3. The shaping of the ribs 5 form steplike shoulders or protuberances 13 in the channel 12. For functional reasons, the channel 12 has other shouldered material portions 14 and 15 of material as well. In the interior of the channel 12, clip protrusions 18 that stand upright toward the outside are mounted on the left and right, facing one another. A local protuberance 41, which because of its shaping acts as a detent protrusion, is located at the top and middle of the U-shaped profile 3.

As shown in FIGS. 3 and 5, in the middle of the base plate 2 of the bearing housing 1, a cup-shaped indentation 6 with an oval through hole 7 is provided. Positioning domes 52 formed by intersecting ribs 8 are located laterally to the left and right of the cup-shaped indentation 6. The positioning domes 52 have, on their ends, a shoulder 9 and merge with a circular trunnion 10. The positioning domes 52 act as a bearing face and as a torsion-prevention means.

Figure 6:
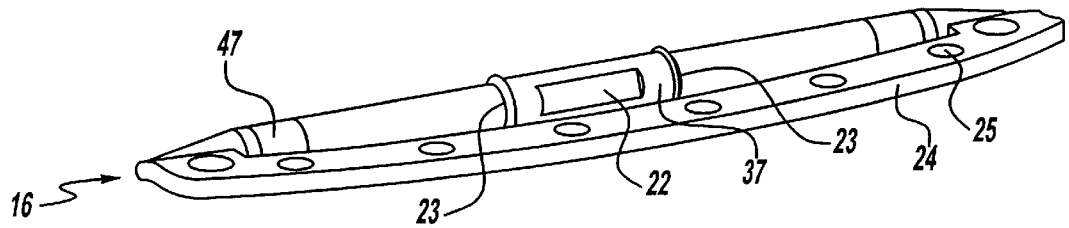
FIG. 6 illustrates the axle body of the bearing device of FIG. 2.

As shown in FIGS. 2 and 6, the bearing device 45 also includes the axle body 16, which is preferably an injection-molded plastic part. The axle body 16 has a cylindrical middle part 37 with a flat face 22 defined on one side, which acts as a detent face for the detent spring 17 (to be described below). The axle body 16 also has two annular raised portions 23 to prevent shifting. Two trunnions 47 that engage the inside of the sun visor body 21, and a flange 24 that likewise engages the inside of the sun visor body 21, are formed onto the axle body 16. The flange 24 has circular push-through features 25 to provide support and anchoring in the sun visor body 21.

As shown in FIG. 7, the bearing device 45 also includes the detent spring 17, as mentioned above. The detent spring 17 is U-shaped and comprises hardened metal. The detent spring 17 has one relatively wide spring leg 35 and one relatively narrow spring leg 36. The free ends of the spring legs 35, 36 are provided with strutlike shoulders 29, 30.

As shown in FIG. 8, the bearing housing 1 finally also includes an adapter 19. The adapter 19 is a plastic injection-molded part, comprising an approximately rectangular middle part 26 with slotlike openings 27, 28 in the bottom part. The slotlike openings 27, 28 are of different sizes. The slotlike openings 27 and 28 serve to receive the correspondingly embodied strutlike shoulders 29 and 30 of the detent spring 17. Runnerlike formations 31 are formed onto the left and right of the middle part 26 and are stabilized with buttresses 32. Preferably, an oval spacer sleeve 33 with an oval through hole 40 on the middle part 26 is also provided. The spacer sleeve 33 is bound to the middle part by means of a strut 34. The corner edges of the middle part 26 are also provided with steplike features 39.

In the assembly operation, first, the detent spring 17 is slipped onto the middle part region 37, intended for it, of the axle body 16. As this is done, the narrower spring leg 36 of the detent spring 17 slides into the detent face 22 of the axle body 16. Next, the axle body 16 with the flange 24 and the premounted detent spring 17 are press-fitted from above into the open U-shaped channel 12 of the bearing housing 1. In the process, the detent spring 17 is introduced into the intended free space 15 in the material, and the axle body 16 is provided with its bearing in the bottom region 20. The annular raised portions 23 on the left and right of the axle body 16, in combination with the two ribs 5, create a means for preventing axial displacement of the axle body 16 relative to the bearing housing 1. After that, the adapter 19 is mounted. The adapter 19, with its runnerlike formations 31 on the left and right, is delivered to the clip protrusions 18 on the bearing housing 1 and pressed in. The adapter 19 is locked in place by the undercut 38 (shown in FIG. 10) of the clip protrusions 18.

In this assembly operation, the detent spring 17 is simultaneously centered and locked. In the process, the adapter 19 is guided in compulsory fashion and positioned by the steplike shoulders 39 via the two ribs 5 in the U-shaped channel 12. The middle part 26 of the adapter 19, with its slotlike openings 27 and 28, receives the strutlike shoulders 29, 30 of the detent spring, so that the detent spring 17 is locked. Via the oval through hole 40, the spacer sleeve 33 likewise finds its coincident positioning with the cuplike indentation 6 of the bearing housing 1. As shown in FIG. 2, the axle body 16 is now embedded in the U-shaped channel 12 and is secured in all directions by the adapter 19. The complete bearing device 45 is now rotatably supported on and bonded to the sun visor body 21.

As shown in FIGS. 9 and 10, the bearing concept makes it possible, by means of the undercut-like protrusions 11 as well as the protuberance 41 and its embodiment as a protrusion, to perform pre-mounting of the bearing device 45 and the sun visor body 21 to a carrier part 42, such as a finished headliner. The possibility thus exists of supplying a preassembled group to a customer. The final mounting in the vehicle is then done there. The intersecting ribs 8 are supported by their shoulder 9 on the sheet metal of the motor vehicle (another carrier part 43), as is the spacer sleeve 33 (as a so-called three-point contact). Finally, a screw 44 is used for the definitive fastening.

Of course, it should be understood that a wide range of changes and modifications can be made to the embodiments described above. It is therefore intended that the foregoing description illustrates rather than limits this invention, and that it is the following claims, including all equivalents, which define this invention.

What is claimed is:

1. A sun visor for a vehicle body comprising:
   a sun visor body, said sun visor body having a middle region and an upper longitudinal edge, said sun visor body defining a recess in said middle region of said upper longitudinal edge,
   a bearing device disposed in said recess, said bearing device comprising a bearing housing, an axle body, a detent spring and an adapter, wherein said bearing housing receives said detent spring, said axle body, and said adapter, said detent spring clamping said axle body to said bearing housing, and
   fastenings for fixing said adapter to said bearing housing, wherein said sun visor body is joined to said bearing device in hinged fashion, and wherein said adapter carries said bearing device and said sun visor body, and is fastened to the vehicle body.

2. A sun visor for a vehicle body comprising:
   a sun visor body, said sun visor body having a middle region and an upper longitudinal edge, said sun visor body defining a recess in said middle region of said upper longitudinal edge, and
   a bearing device disposed in said recess, said bearing device comprising a bearing housing, an axle body, a detent spring and an adapter, wherein said bearing housing receives said detent spring, said axle body, and said adapter, said axle body having trunnions which engage the inside of said sun visor body, said detent spring clamping said axle body to said bearing housing, wherein said adapter is fixed to said bearing housing by clip fastenings, wherein said sun visor body is joined to said bearing device in hinged fashion by said axle body, wherein said adapter carries said bearing device and said sun visor body, and wherein said adapter is fastened to the vehicle body.

3. The sun visor of claim 1 or 2 wherein said bearing housing comprises a base plate and a U-shaped profile integrally joined with said base plate, and wherein said U-shaped profile has a base leg which has a rounded feature.

4. The sun visor of claim 3 wherein said base plate has a vertically extending flange, said base plate has an outer contour, and said flange is offset from and extends parallel to said outer contour and is provided with undercut protrusions.

5. The sun visor of claim 3 wherein said base plate has ribs, said ribs running into the interior of said U-shaped profile and forming protuberances.

6. The sun visor of claim 3 wherein said base plate has a vertically extending flange, said base plate has an outer contour, said flange is offset from and extends parallel to said outer contour and is provided with undercut protrusions, and wherein said base plate has ribs, said ribs running into the interior of said U-shaped profile and forming protuberances.

7. The sun visor of claim 3 wherein said base plate has a cup-shaped indentation which defines an oval through hole for a fastening screw, wherein said screw passes through said adapter, and wherein said base plate includes positioning domes.

8. The sun visor of claim 3 wherein said base plate has ribs, said ribs running into the interior of said U-shaped profile and forming protuberances, said base plate has a cup-shaped indentation which defines an oval through hole for a fastening screw, wherein said screw passes through said adapter, and wherein said base plate includes positioning domes.

9. The sun visor of claim 3 wherein said base plate has a vertically extending flange, said base plate has an outer contour, said flange being offset from and extending parallel to said outer contour and provided with undercut protrusions, said base plate has a cup-shaped indentation which defines an oval through hole for a fastening screw, wherein said screw passes through said adapter, and wherein said base plate includes positioning domes.

10. The sun visor of claim 3 wherein said base plate has ribs, said ribs running into the interior of said U-shaped profile and forming protuberances, said base plate has a vertically extending flange, said base plate has an outer contour, said flange being offset from and extending parallel to said outer contour and provided with undercut protrusions, said base plate has a cup-shaped indentation which defines an oval through hole for a fastening screw, wherein said screw passes through said adapter, and wherein said base plate includes positioning domes.

11. The sun visor of claim 1 or 2 wherein said bearing housing has undercuts and projections.

12. The sun visor of claim 1 wherein said axle body has a cylindrical middle part, said middle part having a flat face that is defined on one end and acts as a detent face for said detent spring, two annular raised portions, said annular raised portions acting as shift-prevention means, two trunnions, said trunnions engaging said sun visor body, and a flange, said flange also engaging said sun visor body.

13. The sun visor of claim 3 wherein said detent spring is U-shaped and has a base leg with a rounded feature which corresponds to said U-shaped profile of said bearing housing, wherein one spring leg of the detent spring is relatively wide and the other spring leg is relatively narrow, said adapter comprising an approximately rectangular middle part having slot recesses, and wherein the free ends of the spring legs have strutlike shoulders which engage said slot recesses in said adapter.

14. The sun visor of claim 3 wherein the walls of said U-shaped profile have clip protrusions for clip fastening of said adapter to said bearing housing.

15. The sun visor of claim 14 wherein said adapter comprises an approximately rectangular middle part having slot recesses and steplike shaped bodies joining said slot recesses to the right and left for engagement with said U-shaped profile of said bearing housing and for locking from behind said clip protrusions of said U-shaped profile that protrude into a profile channel, and further comprising a spacer sleeve, said sleeve defining an oval through hole for a fastening screw.

16. A sun visor for a vehicle body comprising:

a sun visor body, said sun visor body having a middle region and an upper longitudinal edge, said sun visor body defining a recess in said middle region of said upper longitudinal edge, a bearing device disposed in said recess, said bearing device comprising a bearing housing, an axle body, a detent spring and an adapter, wherein said bearing housing receives said detent spring, said axle body, and said adapter, said bearing housing comprising a base plate and a U-shaped profile integrally joined with said base plate, said U-shaped profile having a base leg which has a rounded feature, said base plate having a vertically extending flange and an outer contour, said flange being offset from and extending parallel to said outer contour and provided with undercut protrusions, said base plate having ribs, said ribs running into the interior of said U-shaped profile and forming protuberances, said base plate having a cup-shaped indentation which defines an oval through hole for a fastening screw, wherein said screw passes through said adapter, said base plate further including positioning domes, wherein the walls of said U-shaped profile having clip protrusions for clip fastening of said adapter to said bearing housing, said axle body having a cylindrical middle part, said middle part having a flat face that is defined on one end and acts as a detent face for said detent spring, two annular raised portions, said annular raised portions acting as shift-prevention means, two trunnions, said trunnions engaging said sun visor body, and a flange, said flange also engaging said sun visor body, said detent spring clamping said axle body to said bearing housing, said detent spring being U-shaped of two legs, said detent spring having a base leg with a rounded feature which corresponds to said U-shaped profile of said bearing housing, wherein one spring leg of the detent spring is relatively wide and the other spring leg is relatively narrow, the free ends of said spring legs having strutlike shoulders, and said adapter comprising an approximately rectangular middle part having slot recesses and steplike shaped bodies joining said slot recesses to the right and left for engagement with said U-shaped profile of said bearing housing and for locking from behind said clip protrusions of said U-shaped profile that protrude into a profile channel, and further comprising a spacer sleeve, said sleeve defining an oval through hole for a fastening screw, wherein said free ends of said spring legs engage said slot recesses in said adapter, wherein said sun visor body is joined to said bearing device in hinged fashion, and wherein said adapter carries said bearing device and said sun visor body, and is fastened to the vehicle body.

* * * * *